United States Patent
Hunter et al.

(10) Patent No.: US 10,926,319 B2
(45) Date of Patent: Feb. 23, 2021

(54) CLAD SHEETS FOR HEAT EXCHANGERS

(71) Applicant: Novelis Inc., Atlanta, GA (US)

(72) Inventors: John Anthony Hunter, Kingston (CA); Yudie Yuan, Roswell, GA (US)

(73) Assignee: NOVELIS INC., Atlanta, GA (US)

( * ) Notice: Subject to any disclaimer, the term of this patent is extended or adjusted under 35 U.S.C. 154(b) by 101 days.

(21) Appl. No.: 16/401,355

(22) Filed: May 2, 2019

(65) Prior Publication Data

US 2019/0255601 A1 Aug. 22, 2019

Related U.S. Application Data

(62) Division of application No. 15/538,080, filed as application No. PCT/US2015/065667 on Dec. 15, 2015, now abandoned.

(Continued)

(51) Int. Cl.
*B22D 7/02* (2006.01)
*C22C 21/02* (2006.01)
*F28F 21/08* (2006.01)
*F28F 3/14* (2006.01)
*C22C 21/12* (2006.01)
*C22C 21/00* (2006.01)
(Continued)

(52) U.S. Cl.
CPC .............. *B22D 7/02* (2013.01); *B32B 15/016* (2013.01); *C22C 21/00* (2013.01); *C22C 21/02* (2013.01); *C22C 21/12* (2013.01); *F28F 3/14* (2013.01); *F28F 19/06* (2013.01); *F28F 21/084* (2013.01); *Y10T 428/12764* (2015.01)

(58) Field of Classification Search
None
See application file for complete search history.

(56) References Cited

U.S. PATENT DOCUMENTS 3,482,951 A 12/1969 Hubbell et al.
3,893,823 A 7/1975 Webb
(Continued)

FOREIGN PATENT DOCUMENTS

CN 101578382 11/2009
CN 101972926 2/2011
(Continued)

OTHER PUBLICATIONS

U.S. Appl. No. 15/538,080 , "Final Office Action", dated Dec. 3, 2018, 12 pages.

(Continued)

*Primary Examiner* — Daniel J. Schleis
(74) *Attorney, Agent, or Firm* — Kilpatrick Townsend & Stockton LLP (57) ABSTRACT

This application discloses a material including an aluminum metal alloy cladding fusion-cast to a metal alloy core. Also disclosed is a material having a metal core with a high content of scrap metal and having two sides, a first aluminum metal cladding fusion cast to the first side of the core layer, and a second aluminum metal cladding fusion cast to the second side of the core layer. The materials can be in a form of a sheet. Sheets are roll bonded together to create permanent metallurgical bonds except at regions where a weld-stop ink is applied. The sheets are used to make corrosion resistant heat exchangers.

20 Claims, 3 Drawing Sheets

Related U.S. Application Data (60) Provisional application No. 62/095,146, filed on Dec. 22, 2014.

(51) Int. Cl.
  *B32B 15/01* (2006.01)
  *F28F 19/06* (2006.01)

(56) References Cited

U.S. PATENT DOCUMENTS

| | | | |
|---|---|---|---|
| 4,172,181 | A | 10/1979 | Kawase et al. |
| 6,329,075 | B1 | 12/2001 | Nener et al. |
| 6,902,828 | B2 | 6/2005 | Gazapo et al. |
| 7,472,740 | B2 | 1/2009 | Anderson et al. |
| 7,748,434 | B2 | 7/2010 | Wagstaff |
| 7,762,310 | B2 | 7/2010 | Bull et al. |
| 7,789,124 | B2 | 9/2010 | Gallerneault |
| 7,882,887 | B2 | 2/2011 | Wagstaff et al. |
| 7,975,752 | B2 | 7/2011 | Wagstaff |
| 8,336,603 | B2 | 12/2012 | Bischoff et al. |
| 8,347,949 | B2 | 1/2013 | Anderson et al. |
| 8,415,025 | B2 | 4/2013 | Anderson et al. |
| 8,418,748 | B2 | 4/2013 | Wagstaff et al. |
| 2008/0008903 | A1 | 1/2008 | Bull et al. |
| 2009/0214891 | A1* | 8/2009 | Lahaye ............... C22C 21/08 428/654 |
| 2010/0112370 | A1 | 5/2010 | Ueda et al. |
| 2010/0124668 | A1* | 5/2010 | Gupta ............... B32B 15/016 428/654 |
| 2010/0159275 | A1 | 6/2010 | Geho et al. |
| 2011/0027610 | A1 | 2/2011 | Tatsumi et al. |
| 2011/0240277 | A1 | 10/2011 | Westergard et al. |
| 2012/0077947 | A1 | 3/2012 | Kitaura |
| 2012/0160233 | A1 | 6/2012 | Yuan et al. |
| 2012/0199634 | A1 | 8/2012 | Ekstroem et al. |
| 2013/0302642 | A1 | 11/2013 | Ren |
| 2014/0329108 | A1 | 11/2014 | Bezencon et al. |
| 2017/0259529 | A1 | 9/2017 | Brinkman et al. |

FOREIGN PATENT DOCUMENTS

| | | |
|---|---|---|
| CN | 103389000 | 11/2013 |
| CN | 103502747 | 1/2014 |
| CN | 103600524 | 2/2014 |
| CN | 103820790 | 5/2014 |
| CN | 104039996 | 9/2014 |
| CN | 104056859 | 9/2014 |
| DE | 102008059450 | 6/2010 |
| EA | 201170542 | 10/2011 |
| EP | 0117710 | 9/1984 |
| EP | 1178268 | 2/2002 |
| EP | 2130669 | 12/2009 |
| JP | 05212562 | 8/1983 |
| JP | 62227504 | 10/1987 |
| JP | 2007515293 | 6/2007 |
| JP | 2007262565 | 10/2007 |
| JP | 2013505135 | 2/2013 |
| RU | 2012119533 | 11/2013 |
| WO | 2005014274 | 7/2004 |
| WO | 2006053701 | 5/2006 |
| WO | 2010126987 | 11/2010 |
| WO | 2013025797 | 2/2013 |
| WO | 2013025802 | 2/2013 |
| WO | 2013037918 | 3/2013 |
| WO | 2014062653 | 4/2014 |

OTHER PUBLICATIONS

U.S. Appl. No. 15/538,080, "Non-Final Office Action", dated Aug. 28, 2018, 14 pages.
U.S. Appl. No. 15/538,080, "Restriction Requirement", dated Aug. 7, 2018, 8 pages.
Australian Application No. 2015369961, "First Examination Report", dated Mar. 28, 2018, 4 pages.
Australian Application No. 2015369961, "Notice of Allowance", dated Sep. 11, 2018, 4 pages.
Australian Application No. U2015369961, "Second Examination Report", dated Jun. 28, 2018, 3 pages.
Canadian Application No. 2,971,596, "Office Action", dated Apr. 3, 2019, 3 pages.
CA2,971,596, "Office Action", dated Aug. 13, 2018, 4 pages.
Chinese Application No. 201580070025.1, "Office Action", dated Dec. 5, 2018, 22 pages.
Chinese Application No. 201580070025.1, "Office Action", dated May 11, 2018, 27 pages.
Chinese Application No. 201580070025.1, "Office Action", dated May 8, 2019, 19 pages.
European Application No. 15821203.5, "Office Action", dated Jun. 25, 2019, 5 pages.
ISRI, "Scrap Specifications Circular 2012", Jan. 19, 2012, 56 pages.
Japanese Application No. 2017-531494, "Office Action", dated Feb. 26, 2019, 5 pages.
Japanese Application No. 2017-531494, "Office Action", dated Jul. 3, 2018, 7 pages.
Korean Application No. 10-2017-7020451, "Office Action", dated Sep. 4, 2018, 12 pages.
Korean Application No. 10-2017-7020451, "Office Action", dated Feb. 22, 2019, 13 pages.
Korean Application No. 10-2017-7020451, "Office Action", dated Aug. 14, 2019, 5 pages.
International Application No. PCT/US2015/065667, "International Preliminary Report on Patentability", dated Jul. 6, 2017, 9 pages.
International Application No. PCT/US2015/065667, "International Search Report and Written Opinion", dated Apr. 8, 2016, 14 pages.
Russian Application No. 2017124657, "Notice of Decision to Grant", dated Oct. 15, 2018, 14 pages.
Russian Application No. 2017124657, "Office Action", dated Jun. 28, 2018, 10 pages.
Korean Application No. 10-2017-7020451, "Office Action", dated Oct. 7, 2019, 6 pages.
Canadian Application No. 2,971,596, Notice of Allowance, dated Jun. 15, 2020, 1 page.
Canadian Application No. 2,971,596, Office Action, dated Nov. 28, 2019, 3 pages.
Chinese Application No. 201910707107.2, Office Action, dated May 18, 2020, 26 pages.
European Application No. 15821203.5, Notice of Decision to Grant, dated May 28, 2020, 2 pages.
Japanese Application No. 2017-531494, Office Action, dated Jul. 14, 2020, 4 pages.
Chinese Application No. 201580070025.1, Office Action, dated Sep. 30, 2020, 13 pages.
Chinese Application No. 201910707107.2, Office Action, dated Oct. 29, 2020, 32 pages.
Indian Application No. 201717021716, "First Examination Report", dated Dec. 26, 2020, 7 pages.
Japanese Application No. 2017-531494, Trial Decision to Grant, dated Dec. 15, 2020, 2 pages.

* cited by examiner

CLAD SHEETS FOR HEAT EXCHANGERS

CROSS-REFERENCE TO RELATED APPLICATION

This application is a divisional of U.S. application Ser. No. 15/538,080, filed Jun. 20, 2017, which is a national stage application under 35 U.S.C. § 371 of International Application No. PCT/US2015/065667, filed Dec. 15, 2015, which claims the benefit of U.S. Provisional Application No. 62/095,146, filed on Dec. 22, 2014, which are hereby incorporated herein by reference in their entireties.

FIELD OF THE INVENTION

The invention relates to the fields of material science and material chemistry, particularly materials and methods to improve corrosion resistance in heat exchangers.

BACKGROUND

Metal corrosion is a significant problem in the field of material science and material chemistry. Corrosion resistance is a desirable property in metals, particularly those used in aggressive environments conducive to corrosion. One example of such an aggressive environment is seawater. Accordingly, corrosion resistance of metal materials used in marine applications is an acute problem in the field of material science.

SUMMARY

The terms "invention," "the invention," "this invention" and "the present invention" used herein are intended to refer broadly to all of the subject matter of this patent application and the claims below. Statements containing these terms should be understood not to limit the subject matter described herein or to limit the meaning or scope of the patent claims below. Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings and each claim.

Disclosed are different aluminum (Al) alloy materials that can be used in roll bonding processes to produce plate heat exchangers which contain flow channels or tubes for carrying fluid. These heat exchangers are made with relatively low-cost, roll-bonding processes and display a high heat transfer efficiency and excellent corrosion resistance, particularly in marine environments.

Figure 1:
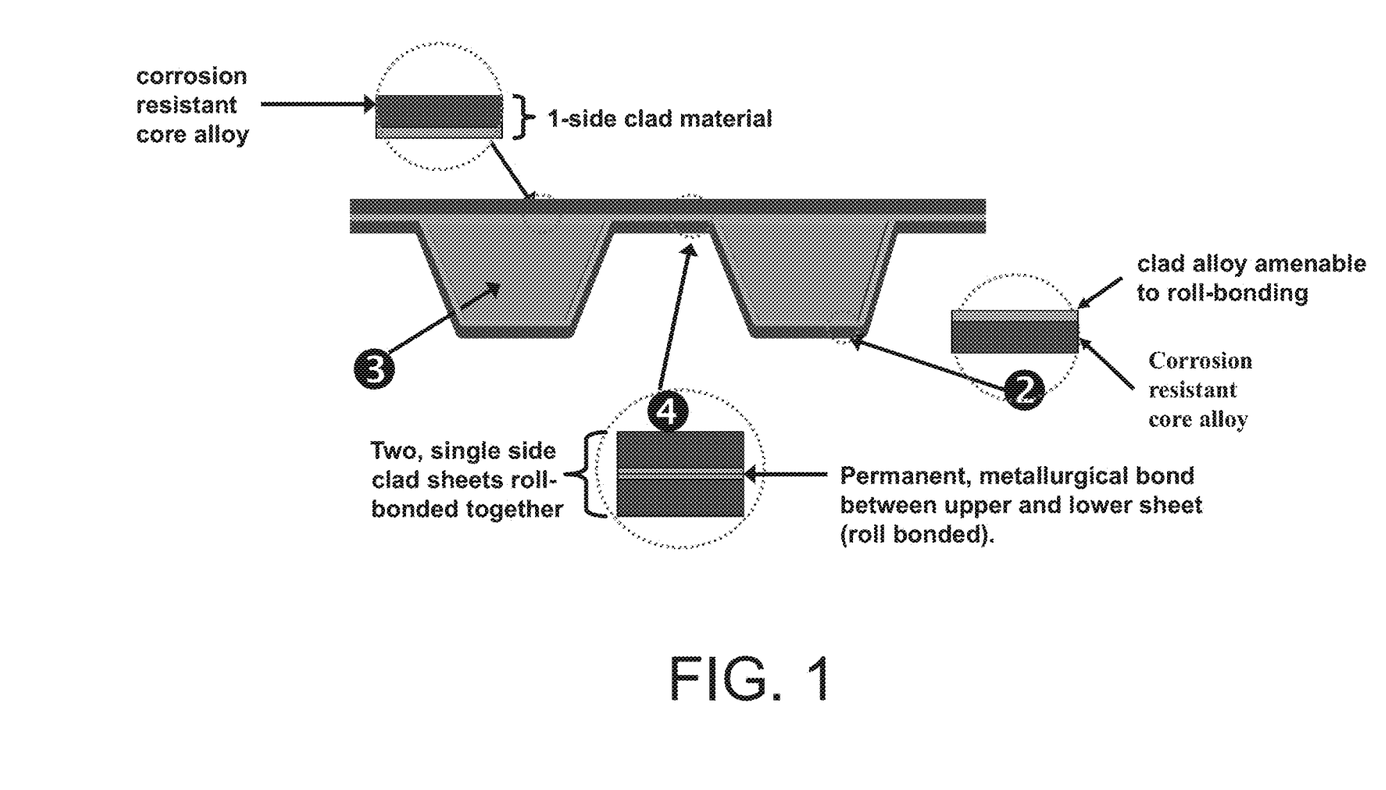
FIG. 1 is a schematic representation of an aluminum panel comprised of one side clad sheet, wherein the clad layer of one clad sheet faces the clad layer of a second sheet and they are roll bonded together to produce an integral tube, twin plate heat exchanger.

In one process, two separate Al sheets are passed simultaneously through a roll stand, usually at elevated temperature. The upper surface of the lower sheet, which contacts the lower surface of the upper sheet, is usually screen printed with a weld-stop ink in a desired pattern. The appropriate processing temperature for roll bonding will vary as a function of the total gauge reduction and the alloys being processed, but is likely to be somewhere in the range of 150° C. to 500° C. After roll-bonding, a permanent metallurgical bond is created between the two sheets (effectively creating a single sheet). However, the regions of the mating surface incorporating the weld-stop ink do not form a permanent bond. These regions can be separated and the subsequent gap inflated to create integral flow channels suitable for a heat exchanger working fluid (FIG. 1).

One Side Clad Material

In one example, provided is a material comprising a corrosion resistant metal alloy core and a metal alloy cladding which is fusion-cast to the metal alloy core to form a one side clad sheet. Fusion casting is known in the art as evidenced in the following U.S. Pat. Nos. 7,748,434, 7,762,310, 7,789,124, 7,882,887, 7,975,752, 8,336,603, 8,347,949, 8,415,025, and 8,418,748.

The metal alloy cladding is selected for ease of roll bonding. In this example the clad layers of two, one side clad sheets are roll bonded to each other to produce an integral tube, twin plate heat exchanger (FIG. 1). This roll bonding process produces a permanent metallurgical bond between regions of the clad layer of the first sheet and the clad layer of the second sheet.

Many of the most corrosion resistant alloys contain significant concentrations of magnesium (Mg). This Mg content prevents the use of these alloys in roll-bonding due at least in part to uncontrolled Mg-oxide generation at the roll-bond interface. The central concept is to use a single side clad sheet starting stock in the roll-bonding process. This asymmetric arrangement allows metallurgical bonding at the mating surface to be controlled by the composition of the clad layer. This effectively permits the use of any core alloy in a twin-plate heat exchanger (FIG. 1).

In another example, the clad layers of two sheets of a one side clad material are roll bonded together. AA5XXX alloys may be used as the core layer. Generally, AA5XXX alloys which are considered "dilute" or "low in magnesium" are preferred. These alloys are immune to inter-granular corrosion and display good general corrosion resistance. In one non-limiting example, an AA5005 alloy is used. In another non-limiting example, an AA5052 alloy is used. Alloys with magnesium contents in the range 0.5% to 2.7% (weight percent (wt. %) are considered realistic candidates for the above described single-side-clad configuration. In this patent application, all the percentage numbers associated with individual elements in these alloys are expressed in wt. %. The lower limit reflects the minimum needed to provide good marine corrosion resistance, while the upper limit represents the maximum Mg content that can be accommodated without risking sensitization of the microstructure and increased susceptibility to inter-granular corrosion (IGC).

An AA3XXX or AA1XXX alloy can be used for the clad layer. Generally, AA3XXX and AA1XXX alloys which are considered "dilute" or "low in magnesium" are used for ease of roll bonding. The wt. % of magnesium in these alloys is generally in the range of 0.01-0.05% for AA1XXX alloys and 0.01-0.2% for AA3XXX alloys. In the one-side-clad configuration described above, the primary purpose of the AA3XXX clad layer or the AA1XXX clad layer is to allow effective roll bonding of the aluminum sheet. A significant consideration for Mg content is the upper limit beyond which Mg oxidation will increase to an extent where effective and consistent roll-bonding cannot occur. Under normal ambient, atmospheric conditions, this limit is probably around 0.2% Mg; although 0.4% Mg could potentially be accommodated if gauge reductions were high enough. If special measures were taken (e.g. inert atmosphere roll-bonding), then it would be theoretically possible to roll bond using clad alloys of >0.4% Mg.

In another non-limiting example, an AA3003 alloy is used for the clad layer. In another non-limiting example, an AA1100 alloy is used for the clad layer. As long as the Mg content is <0.2% most, if not all, AA1XXX and AA3XXX alloys could be considered for use.

Two Side Clad Material

Figure 2:
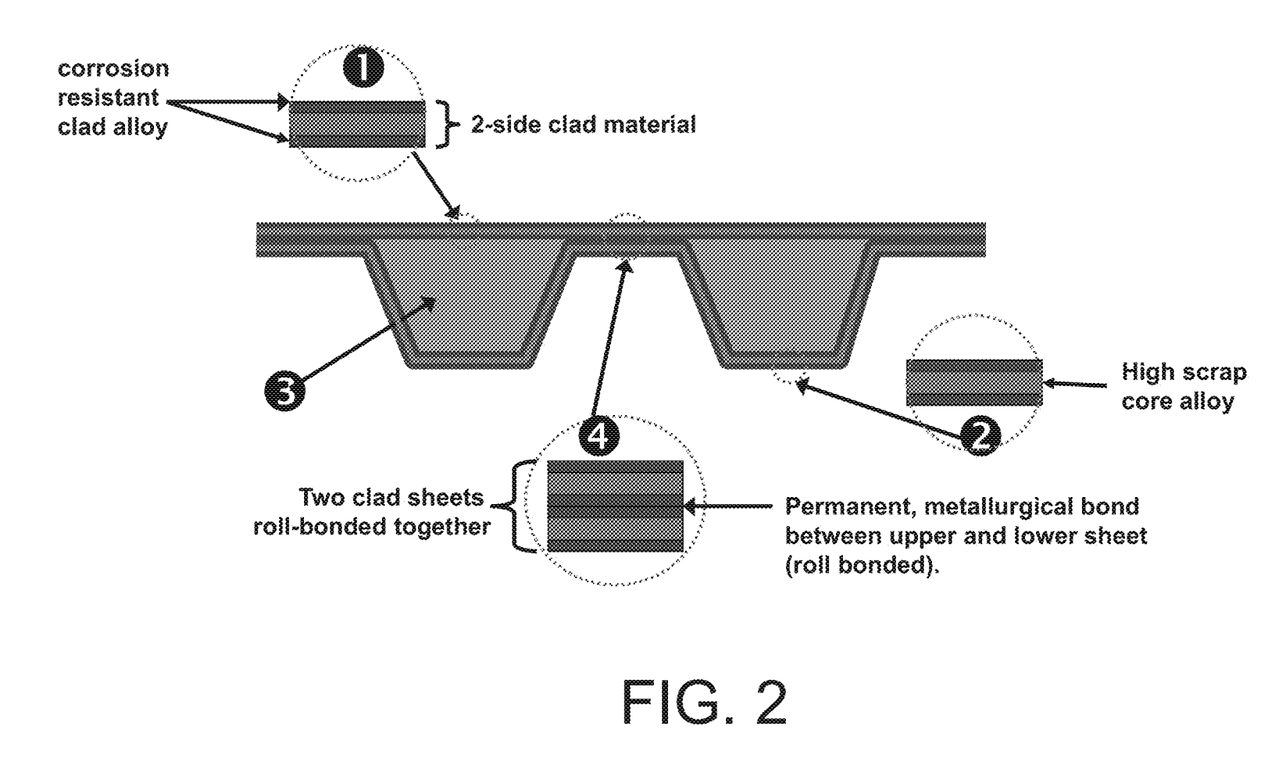
FIG. 2 is a schematic representation of an aluminum panel comprised of a fusion cast two-side-clad sheet, wherein two such sheets are roll bonded together to put producing an integral tube, twin plate heat exchanger.

Also provided is a material, comprising a metal core comprising a high content of scrap metal and having two sides, a first metal cladding fusion cast to one side of the core, and a second metal cladding fusion cast to the other side of the core. The material can be in a form of a sheet. Two of these clad sheets are then roll bonded together to produce a permanent metallurgical bond between regions of a clad layer of the first sheet and a clad layer of the second sheet (FIG. 2).

In this example, the low cost, but corrosion sensitive, core alloy is encapsulated with a corrosion resistant cladding in a manner which prevents contact of the core alloy with either the working fluid (within the integral flow channels), or the external environment (e.g. seawater).

In this example, roll bond friendly alloys are employed for the clad layers. An AA3XXX or AA1XXX alloy can be used for one or both clad layers. In one example, both clad layers are AA3XXX. In another example, both clad layers are AA1XXX. In yet another non-limiting example, one clad layer is AA1XXX and the other clad layer is AA3XXX. In still another non-limiting example, one clad layer is AA1XXX or AA3XXX and the other clad layer is AA5XXX. The clad layers may surround a low cost core layer which can contain a relatively high content of scrap metal containing aluminum.

Variable scrap sources can be used to make the core layer so that the heat exchanger panels can act as an effective aluminum scrap sink. The two side clad example resembles a sandwich structure designed to encapsulate virtually any aluminum-based composition in the core layer, whether defined by an AA number or not. In one example, alloy AA4045 was used as the core layer.

| Alloy  | Cu    | Fe    | Mg    | Mn    | Si    | Ti    | Zn    | Cr    |
|--------|-------|-------|-------|-------|-------|-------|-------|-------|
| AA4045 | 0.062 | 0.376 | 0.320 | 0.811 | 1.614 | 0.010 | 0.062 | 0.012 |

An AA3XXX or AA1XXX alloy can be used for one or both clad layers. Generally, AA3XXX and AA1XXX alloys which are considered "dilute" or "low in magnesium" are used for ease of roll bonding. The wt % of magnesium in these alloys is generally in the range of 0.01-0.05% for AA1XXX alloys and 0.05-0.2% for AA3XXX alloys. In one non-limiting example, an AA3003 alloy is used for the clad layer. In another non-limiting example, an AA1100 alloy is used for the clad layer. As long as the Mg content is <0.2% most, if not all, AA1XXX and AA3XXX alloys could be considered for use as the clad layer.

In another example, traditional roll cladding can be used as an alternative to fusion casting to produce the clad sheet starting stocks. These clad sheets can then be used in the roll bonding process to produce twin-plate heat exchangers. In this case, all the above mentioned limits on compositions for roll bonding would apply. The most notable limitation would be Mg levels limited to <0.2% (perhaps up to 0.4%, if very high reductions were used).

The disclosed aluminum based sheets are used to make heat exchangers that possess high corrosion resistance in aqueous environments such as seawater.

DETAILED DESCRIPTION

Described herein are improved Al-based metal materials that can be described as sheets comprising a core and cladding. In some examples, the improved metal materials are formed into sheets and the cladding is attached to one side of the sheet (one-sided cladding) or to both sides of the sheet (two-sided cladding). One example of the improved metal material is a one-sided clad sheet comprising a metal alloy core and a metal alloy cladding which is fusion-cast to the metal alloy core. Another example of the improved metal material is a sheet comprising a metal core with first metal cladding fusion-cast to the first side of the core, and a second cladding fusion-cast to the second side of the core. Still another example of the improved metal material is a sheet comprising a metal alloy core and a metal alloy cladding which is roll-bonded to the metal alloy core. Yet another example of the improved metal material is a sheet comprising a metal core with first metal cladding roll-bonded to the first side of the core, and a second cladding roll-bonded to the second side of the core. Examples of the improved metal materials described herein can be referred to as "clad sheet alloys."

The inventors discovered that, by combining different metal alloys in the clad sheet alloys, they can achieve one or more of the following advantages: improved ease of fabrication of the metal composites; lowered fabrication costs due to use of scrap in the core layer; increased corrosion resistance; and, incorporation of high scrap metal content. Two clear advantages of the Fusion/Roll bonding combination are corrosion resistance (by virtue of being able to use corrosion resistant alloys that would not normally be roll bondable) and scrap incorporation into the core layer which is not possible in a monolithic form.

Also described herein are processes for preparing the above improved metal materials and forms fabricated from these materials.

Corrosion Resistance

Corrosion resistance of metal materials is an acute problem in the field of material science, particularly when the materials are used in aggressive environments. One example of an aggressive environment is a marine environment. Some metals, such as aluminum, which are typically corrosion resistant under normal conditions, are still prone to corrosion in the marine environment. Aluminum can be very easily oxidized, forming a protective passive oxide film on the metal surface. Formation of a stable oxide film on the aluminum surface generally provides excellent resistance to corrosion. Corrosion of aluminum can take place, however, when the oxide film is damaged or under certain electrochemical conditions, including the presence of chloride anions, such as in seawater. Pitting corrosion is a form of highly localized corrosion occurring on a metal surface, which is often observed to initiate at weak points in the passive film, such as intermetallic inclusions or particles. Once the passive film at local points is broken, ion/electron pairs are created and corrosion is able to proceed by half reactions occurring at the anodic and cathodic sites. Pitting resistance can be evaluated by electrochemical testing methods, such as linear polarization experiments.

Some aluminum alloys possess higher pitting resistance than the other alloys and are therefore more corrosion resistant when used in the aggressive environments, such as seawater. However, such corrosion resistant alloys may be tially be accommodated if gauge reductions were high enough. If special measures were taken (e.g. inert atmosphere roll-bonding), then it would be theoretically possible to roll bond using clad alloys of >0.4% Mg. Generally, alloys containing <0.2% Mg are candidates for roll bonding.

Composition of some roll-bonding compatible alloys (weight percent (wt %)):

| | Chemical Composition, wt % | | | | | | | | | |
|---|---|---|---|---|---|---|---|---|---|---|
| Alloy | Si | Fe | Cu | Mn | Mg | Cr | Zn | Ti | others | Al |
| AA1100 | 0.10-0.20 | 0.20-0.50 | 0.0-0.15 | 0.0-0.05 | 0.0-0.05 | 0.0-0.03 | 0-0.03 | 0.01-0.02 | 0.15 | Balance |
| AA3003 | 0.15-0.55 | 0.50-0.70 | 0.0-0.20 | 1.0-1.5 | 0.0-0.05 | 0.0-0.03 | 0.0-0.10 | 0.0-0.03 | 0.10 | Balance | expensive to produce, and also do not necessarily possess physical properties that allow them to be exploited in certain applications or technological processes. For example, some of the available corrosion resistant aluminum alloys cannot be easily processed by roll-bonding.

Clad Sheet Alloys

Roll-bonding is a cost-efficient fabrication technique highly useful for production of certain composite metals, materials forms and objects. The inventors discovered that it is possible to utilize the advantages of roll-bonding of an aluminum material, yet achieve higher corrosion resistance than allowed by the alloys usually suitable for roll-bonding. This objective can be accomplished by combining the alloys suitable for roll-bonding with corrosion resistant alloys in the same materials. In one particular example, metal sheets and other related forms can be produced that incorporate both aluminum alloys suitable for roll-bonding and highly corrosion resistant alloys.

Sheets and other forms of the materials described herein can be referred to as "clad sheet materials," "clad sheet alloys" and by other related terms. Clad sheet alloys or materials described herein typically incorporate a core of a corrosion resistant alloy and at least one cladding layer for ease in roll bonding (FIG. 1). In one example, the clad of the clad sheet alloys or materials described herein is fabricated from an alloy compatible with a roll-bonding process. Clad sheet materials described herein can include a second cladding. In other words, the clad sheet alloys can be clad on one or both sides. Such sheets may be made with conventional roll-bonding techniques or by fusion casting ingots with a core and one or more clad layers, followed by hot rolling and cold rolling into sheets.

Core

Some examples of the clad sheet alloys described herein contain a core aluminum alloy compatible with conventional roll-bonding processes. In addition, core alloys may be selected for one or more of the following characteristics: formability; corrosion resistance, such as long term corrosion resistance in warm and cold seawater; suitable galvanic balance between core alloy and cladding alloy to ensure self-protection of the clad sheet alloy at the edges exposed to a corrosive environment; compatibility with re-melting; and, conventional rolling processes.

Roll-bonding compatible aluminum alloys contain various elements as shown in the table below.

A significant consideration for Mg content is the upper limit beyond which Mg oxidation will increase to an extent where effective and consistent roll-bonding cannot occur. Under normal ambient, atmospheric conditions, this limit is probably around 0.2% Mg; although 0.4% Mg could poten- In some other examples, the clad sheet alloys described herein contain a core aluminum alloy with high scrap metal content.

Cladding

Clad sheet alloys described herein contain cladding on one or both sides of the sheet. The alloys used for cladding, or "cladding alloys" are aluminum alloys. Some of the cladding alloys are selected for corrosion resistance. For example, in some cases, cladding alloys are selected for high corrosion resistance or for ease of roll bonding or both. For example, cladding alloys may be selected to exhibit long term corrosion resistance in warm and cold seawater. Some other factors used for selection of the cladding alloys are one or more of the following: compatibility with roll bonding; compatibility with fusion casting; formability; corrosion resistance, such as long term corrosion resistance in warm and cold seawater; suitable galvanic balance between core alloy and cladding alloy to ensure self-protection of the clad sheet alloy at the edges exposed to a corrosive environment; compatibility with re-melting; and, conventional rolling processes.

In this example, desirable clad compositions are roll bonding compatible (i.e. very low Mg) but still possess good marine corrosion resistance. In such a case, higher purity base compositions (minimizing Fe, Cu, Mn and other common background impurities) may be used. This is because these elements typically reside as cathodic second phase constituents in the alloy matrix. As such, they tend to promote micro-galvanic activity in chloride bearing media and consequent passive film breakdown and pitting corrosion. Accordingly, alloys such as AA1050, AA1060, AA1070 (or even purer AA1080) might be used. For 3XXX, higher purity base compositions such as AA3003, AA3004 and AA3104 may be used.

Clad Sheet Alloy Examples

One-Sided Clad Sheet

One example of the clad sheet is a one-sided clad sheet alloy. A one-sided clad sheet alloy includes a clad of an aluminum alloy selected for compatibility with roll bonding and a one sided core of an aluminum alloy selected on the basis of maximum resistance to pitting corrosion in an aggressive environment, such as a marine environment. It is important to note that typical aluminum alloys suitable for marine environments due to their high corrosion resistance cannot be roll-bonded due to the presence of Mg based thermal oxides in such alloys. In one example, the cladding is applied by fusion casting technology, followed by hot rolling and cold rolling into sheets. In another example, a clad layer is applied to a core layer through conventional roll bonding techniques.

An aluminum panel comprised of one-sided clad sheet was roll bonded to a second one-sided clad sheet, with the two clad layers facing each other, in order to produce an integral tube, twin-plate heat exchanger. A one side clad sheet comprised a corrosion resistant core alloy and a clad alloy was selected for the ease of roll bonding (FIG. 1). In this example, the core alloy was a AA5XXX alloy and the clad alloy was a AA3XXX alloy. Many of the most corrosion resistant alloys contain significant concentrations of magnesium. This magnesium content prevents the use of these alloys and roll bonding relating to uncontrolled magnesium oxide generation of the roll bonded interface. In this example, a single side clad sheet was used as starting stock in the roll bonding process. This asymmetric arrangement allows metallurgical bonding at the meeting surface to be controlled by the composition of the clad layer. This effectively permits the use of any core alloy in a twin plate heat exchanger. Non-limiting examples of heat exchangers, including heat exchanger plates, which may be made using the alloys and sheets of the present invention are shown in WO2013/025797, WO2013/025802 and WO2014/062653.

Figure 3:
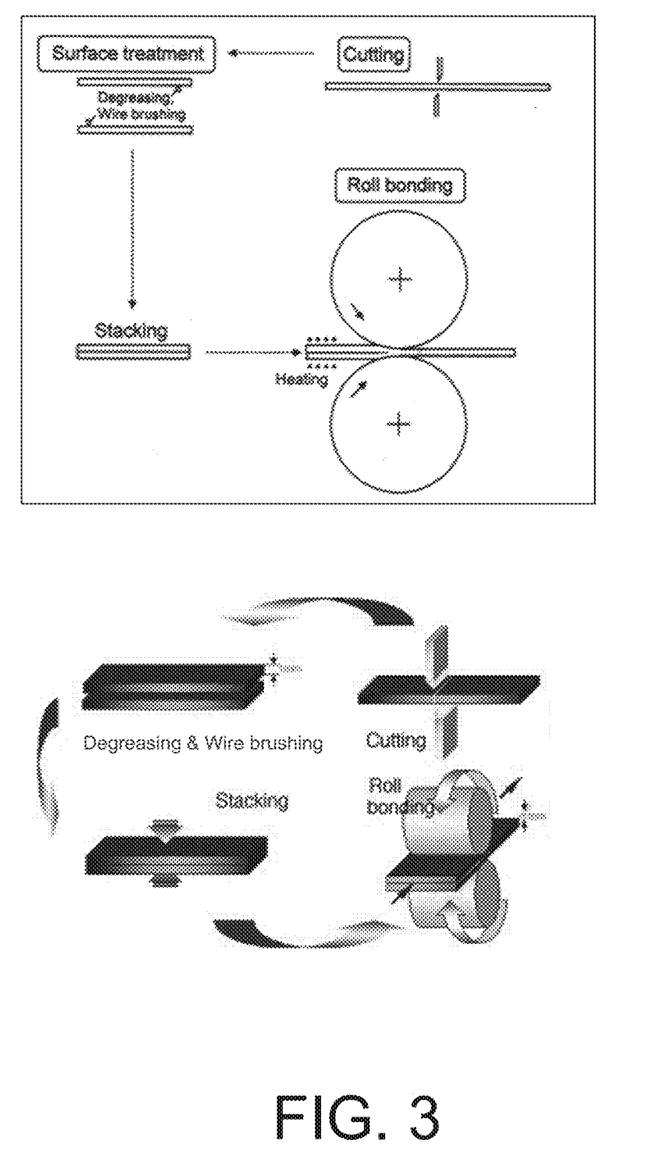
FIG. 3 shows schematic representations of a discontinuous aluminum roll-bonding process to produce an integral tube, twin-plate heat exchanger.

Two separate aluminum sheets are passed simultaneously through a roll stand, usually at an elevated temperature (FIG. 3). The appropriate processing temperature for roll bonding will vary as a function of the total gauge reduction and the alloys being processed, but is likely to be somewhere in the range, 150 to 500° C. The upper surface of the lower sheet is usually screen-printed with a weld-stop ink in a desired pattern. After roll bonding, a permanent metallurgical bond is created between the two sheets, effectively creating a single sheet. However the regions of the mating surface incorporating the weld stop ink do not form a permanent bond. These regions can be separated in the subsequent inflation step to create integral flow channels suitable for a heat exchanger working fluid.

In one example, a material comprising a corrosion resistant metal alloy core and a metal alloy cladding which is fusion-cast to the metal alloy core is provided. The metal alloy cladding is selected for ease of roll bonding. In this example two, one-sided clad sheets are roll bonded to each other to produce an integral tube, twin plate heat exchanger (FIG. 1). This roll bonding process produces a permanent metallurgical bond between regions of the clad layer of the first sheet and the clad layer of the second sheet.

In one example, two sheets of a one-sided clad material are employed and are roll bonded together. AA5XXX alloys may be used as the core layer. Generally, AA5XXX alloys which are considered "dilute" or "low in magnesium" are used. These alloys are relatively immune to intergranular corrosion and display good corrosion resistance. In one example, a AA5005 alloy is used. In another example, a AA5052 alloy is used.

An AA3XXX or AA1XXX alloy can be used for the clad layer. Generally, AA3XXX and AA1XXX alloys which are considered "dilute" or "low in magnesium" are used for ease of roll bonding. The wt % of magnesium in these alloys is generally in the range of 0.01-0.05% for AA1XXX alloys and 0.05-0.2% for AA3XXX alloys. In one example, an AA3003 alloy is used for the clad layer. In another example, an AA1100 alloy is used for the clad layer. As long as the Mg content is <0.2% most, if not all, AA1XXX and AA3XXX alloys could be considered for use as the clad layer.

Two-Sided Clad Sheet

Another example of the clad sheet alloys of the invention is a two-sided clad sheet alloy (FIG. 2). In one example, a two-sided clad sheet alloy comprises at least one side of cladding selected for its compatibility with corrosion resistance. The cladding on the second side may be of the same corrosion resistant alloy (symmetric sheet) or of a different alloy (asymmetric sheet). Using different combinations of core and cladding allows utilization of various alloy properties and fabrication processes to create cost-effective clad sheet alloys with desirable properties. One example of a two-sided clad sheet alloy is an asymmetric two-sided clad sheet alloy incorporating a core with high scrap metal content, a one sided cladding of high corrosion resistance alloy suitable for marine applications, and a second sided cladding of a moderately corrosion resistant, roll-bonding compatible alloy. This asymmetric two-sided sheet alloy utilizes high scrap metal content and roll bonding, thus simplifying fabrication and decreasing production costs, while at the same time providing a high degree of corrosion resistance.

Also provided is material comprising a metal core comprising a high content of scrap metal and having two sides, a first metal cladding fusion cast to one side of the core, and a second metal cladding fusion cast to the other side of the core. The material can be in a form of a sheet. Two of these clad sheets are then roll bonded together to produce a permanent metallurgical bond between regions of a clad layer of the first sheet and a clad layer of the second sheet.

In this example, the low cost, but corrosion sensitive core alloy is encapsulated with a corrosion resistant cladding in a manner which prevents contact of the core alloy with either the working fluid (within the integral flow channels), or the external environment (e.g. seawater).

In this example, roll bond friendly alloys are employed. An AA3XXX or AA1XXX alloy can be used for one or both clad layers. In one example, both clad layers are AA3XXX. In another example, both clad layers are AA1XXX. In yet another example, one clad layer is AA1XXX and the other clad layer is AA3XXX. In still another example, one clad layer is AA1XXX or AA3XXX and the other clad layer is AA5XXX.

The clad layers may surround a low cost core layer which can contain a relatively high content of scrap metal containing aluminum.

| alloy | Cu | Fe | Mg | Mn | Si | Ti | Zn | Cr |
|---|---|---|---|---|---|---|---|---|
| AA4045 | 0.062 | 0.376 | 0.320 | 0.811 | 1.614 | 0.010 | 0.062 | 0.012 |

In one example, the core alloy is an AA4045 alloy as shown above. The definition of scrap metal means that it contains higher Si, Fe, Cu and Zn elements.

A AA3XXX or AA1XXX alloy can be used for one or both clad layers. Generally, AA3XXX and AA1XXX alloys which are considered "dilute" or "low in magnesium" are used for ease of roll bonding. As long as the Mg content is <0.2% most if not all AA1XXX and AA3XXX alloys could be considered for use as the clad layer. The weight percent (wt %) of magnesium in these alloys is generally in the range of 0.01-0.05 for AA1XXX alloys and 0.05-0.2 for AA3XXX alloys. In one example, an AA3003 alloy is used for the clad layer. In another example, an AA1100 alloy is used for the clad layer.

Processes for Making Corrosion Resistant Heat Exchanger

The clad sheet alloys described herein can be fabricated by the processes that include at least some of the technologies described herein. The processes for fabricating cast sheet alloys are included within the scope of the present disclosure.

Two separate Al sheets are passed simultaneously through a roll stand (usually at elevated temperature) (FIG. 3). The upper surface of the lower sheet is usually screen printed with a weld-stop ink in a desired pattern before it contacts the lower surface of the upper sheet. After roll-bonding, a permanent metallurgical bond is created between the two sheets (effectively creating a single sheet). However, the regions of the mating surface incorporating the weld-stop ink do not form a permanent bond. These regions can be separated and the subsequent gap inflated to create integral flow channels suitable for a heat exchanger working fluid.

Roll bonding temperature ranges will be from about 150° C. to 500° C. depending on the alloys/gauges and total reductions being used, as known to one of ordinary skill in the art. The maximum inflation height will depend on the design requirement and the warm/hot forming characteristics of the alloy(s) being roll bonded; especially the maximum elongation of the alloy strip.

Uses and Applications

Clad sheet alloys described herein can be used in a variety of applications. One exemplary application is fabrication of aluminum panel heat exchanger models for power plants. More generally, clad sheet alloys with high corrosion resistance cladding are suitable for various uses in marine environments. These clad sheet alloys can be used to extract useful energy from relatively low grade heat waste such as the warm water found in the upper ocean, or from other waste heat flows for example discharges from power plants, or discharges associated with other industrial processes.

Properties and Advantages

The clad sheet alloys described herein can possess various structural and functional characteristics and properties. These characteristics and properties can be used for descriptive and distinguishing purposes, but can also be advantageously employed in various uses and applications of the combination coatings described herein. Some, but not all, of the characteristics and properties of the films and coatings are ease and lower cost of fabrication, which may be achieved, for example, by utilizing roll bonding technology and/or scrap metal and excellent corrosion resistance. Examples of the clad sheet alloys suitable for specific applications can possess some application-specific characteristics.

Objects, forms, apparatuses and similar things fabricated or comprising clad sheet alloys are included within the scope of the present invention. One exemplary object is a heat exchanger.

The following examples will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the invention. During the studies described in the following examples, conventional procedures were followed, unless otherwise stated. Some of the procedures are described below for illustrative purpose.

Example 1

An ingot comprising an AA5005A core and an AA3003 clad was cast in a 1900 mm wide mold. The ingot was about 12,000 Kg with 10% (wt %) clad. The core surface was scalped approximately 12 mm. The liner surface was scalped approximately 11 mm. The ingot was center split to enhance efficiency of production. The scalped ingot was run through a reversing mill with the liner 3003 on the bottom surface at the hotline and on the top surface at the cold and finish line. Two edge cuts were made. The cold ingot was run through a reversing mill after cropping, and then on to a finishing mill. A ground work roll with a particular grind was used to indicate the clad surface of the sheet.

Example 2

An aluminum panel comprised of one-side-clad sheet produced as in Example 1 was roll bonded to a second one-side-clad sheet produced as in Example 1, with the two clad layers facing each other, in order to produce an integral tube, twin-plate heat exchanger.

Many of the most corrosion resistant alloys contain significant concentrations of magnesium. This magnesium content prevents the use of these alloys and roll bonding relating to uncontrolled magnesium oxide generation of the roll bonded interface. In this example, a single side clad sheet was used as starting stock in the roll bonding process. This asymmetric arrangement allows metallurgical bonding at the meeting surface to be controlled by the composition of the clad layer. This effectively permits the use of any core alloy in a twin plate heat exchanger.

Two separate aluminum sheets are passed simultaneously through a roll stand, usually at an elevated temperature (FIG. 3). The upper surface of the lower sheet is usually screen-printed with a weld-stop ink in a desired pattern. After roll bonding, a permanent metallurgical bond is created between the two sheets, effectively creating a single sheet. However the regions of the mating surface incorporating the weld stop ink do not form a permanent bond. These regions can be separated in the subsequent inflation step to create integral flow channels suitable for a heat exchanger working fluid.

Example 3

In this example, an aluminum panel comprised of a two-side-clad sheet is roll bonded to another two-side-clad sheet to put producing integral tube, twin plate heat exchanger. The clad upper surface of the lower sheet is usually screen-printed with a weld-stop ink in a desired pattern. In this example, the two-sided clad sheet is comprised of corrosion resistant clad alloy and a low-cost, high scrap core. An integral flow channel for the working fluid is created between the upper and the lower sheet by applying pressure to the areas screen-printed with a weld-stop ink. Depending on the alloys being used and the overall gauges, inflation of the channels can be achieved by techniques known to one of ordinary skill in the art, such as compressed air, or hydraulic fluid (if higher pressures are needed). A cross-section through the joint region between the upper and lower fusion sheets using roll bonding shows a permanent metallic bond. In this manner the corrosion sensitive core alloy which contains scrap at lower cost is encapsulated with a corrosion resistant cladding in a manner that prevents contact with either the working fluid (within the integral flow channels), or the external environment (e.g., seawater).

All patents, publications and abstracts cited above are incorporated herein by reference in their entirety. Different arrangements and combinations of the elements and the features described herein are possible. Similarly, some features and sub combinations are useful and may be employed without reference to other features and sub combinations. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the present invention.

The invention claimed is:

1. A method of making a heat exchanger comprising:
   a. obtaining a first composite metal sheet comprising a first clad layer comprising an AA1XXX or an AA3XXX aluminum alloy wherein the Mg content is <0.2 wt % and a core layer, wherein the first clad layer is adjacent to a first side of the core layer;
   b. obtaining a second composite metal sheet comprising a first clad layer comprising an AA1XXX or an AA3XXX aluminum alloy wherein the Mg content is <0.2 wt % and a core layer, wherein the first clad layer is adjacent to a first side of the core layer;
   c. applying weld stop ink to selected regions of the first clad layer of a first composite metal sheet;
   d. placing the first clad layer of the first composite metal sheet adjacent to the first clad layer of the second composite metal sheet wherein the selected regions are between the first composite metal sheet and the second composite metal sheet;
   e. roll-bonding the two composite metal sheets; and,
   f. inflating the selected regions to form channels.

2. A method of making a heat exchanger comprising:
   a. obtaining a first composite metal sheet comprising a first clad layer comprising an AA1XXX or an AA3XXX aluminum alloy wherein the Mg content is <0.2 wt %, a core layer comprising aluminum scrap metal, and a second clad layer comprising an AA1XXX or an AA3XXX aluminum alloy wherein the Mg content is <0.2 wt %, wherein the first clad layer is adjacent to a first side of the core layer and the second clad layer is adjacent to a second side of the core layer;
   b. obtaining a second composite metal sheet comprising a first clad layer comprising an AA1XXX or an AA3XXX aluminum alloy wherein the Mg content is <0.2 wt %, a core layer comprising aluminum scrap metal, and a second clad layer comprising an AA1XXX or an AA3XXX aluminum alloy wherein the Mg content is <0.2 wt %, wherein the first clad layer is adjacent to a first side of the core layer and the second clad layer is adjacent to a second side of the core layer;
   c. applying weld stop ink to selected regions of the first or second composite metal sheet;
   d. contacting the first composite metal sheet with the second composite metal sheet such that the selected regions are between the first composite metal sheet and the second composite metal sheet;
   e. roll-bonding the two composite metal sheets; and,
   f. inflating the selected regions to form channels.

3. A heat exchanger made by the method of claim 1.

4. A heat exchanger made by the method of claim 2.

5. The method of claim 1, wherein the core layers of the first composite sheet metal and the second composite sheet metal both comprise AA5XXX aluminum alloys.

6. The method of claim 2, wherein the core layers of the first composite sheet metal and the second composite sheet metal both comprise AA5XXX aluminum alloys.

7. The method of claim 1, wherein the core layers of the first composite sheet metal and the second composite sheet metal both comprise alloys with an Mg content from 0.5 to 2.7 wt. %.

8. The method of claim 2, wherein the core layers of the first composite sheet metal and the second composite sheet metal both comprise alloys with an Mg content from 0.5 to 2.7 wt. %.

9. The method of claim 1, wherein at least one of the core layers of the first composite sheet metal and the second composite sheet metal comprises an AA5005 alloy or an AA5052 alloy.

10. The method of claim 1, wherein the core layers of the first composite sheet metal and the second composite sheet metal both comprise aluminum comprising scrap metal input.

11. The method of claim 1, wherein at least one of the first clad layer of the first composite metal sheet and the first clad layer of the second composite metal sheet comprises an AA3003 alloy or AA1100 alloy.

12. The method of claim 2, wherein obtaining a first composite metal sheet in step a. comprises fusion casting the first clad layer, the core layer and the second clad layer to form an ingot and then rolling the ingot to make the first composite metal sheet.

13. The method of claim 2, wherein obtaining a second composite metal sheet in step b. comprises fusion casting the first clad layer, the core layer and the second clad layer to form an ingot and then rolling the ingot to make the second composite metal sheet.

14. The method of claim 1, wherein the roll-bonding is conducted at a temperature of from 150 to 500° C.

15. An integral panel produced by the process of claim 1, comprising:
   a. an inner layer comprising the first clad layer of the first composite metal sheet and the first clad layer of the second composite metal sheet,
   b. a first outer layer comprising the core layer of the first composite metal sheet; and
   c. a second outer layer comprising the core layer of the second composite metal sheet.

16. The integral panel of claim 15, wherein the inner layer comprises an AA1100 alloy, an AA1050 alloy, an AA1060 alloy, an AA1070 alloy, an AA1080 alloy, an AA3003 alloy, an AA3004 alloy, or an AA3104 alloy.

17. The integral panel of claim 15, wherein the first outer layer and the second outer layer both comprise alloys with an Mg content from 0.5 to 2.7 wt. %.

18. The integral panel of claim 15, wherein the first outer layer comprises an AA4045 alloy, an AA5005 alloy, or an AA5052 alloy.

19. The integral panel of claim 15, wherein the second outer layer comprises an AA4045 alloy, an AA5005 alloy, or an AA5052 alloy.

20. An integral panel produced by the process of claim 2.

* * * * *